US007809398B2

(12) United States Patent
Pearson (10) Patent No.: US 7,809,398 B2
(45) Date of Patent: Oct. 5, 2010

(54) SYSTEM AND METHOD OF STORING CONTACT INFORMATION

(75) Inventor: Larry B. Pearson, San Antonio, TX (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1168 days.

(21) Appl. No.: 11/389,346

(22) Filed: Mar. 24, 2006

(65) Prior Publication Data

US 2007/0223683 A1    Sep. 27, 2007

(51) Int. Cl.
*H04B 1/38* (2006.01)
(52) U.S. Cl. .................. 455/550.1; 455/414.2
(58) Field of Classification Search .......... 707/1; 379/201.01
See application file for complete search history.

(56) References Cited

U.S. PATENT DOCUMENTS

| 7,440,746 | B1* | 10/2008 | Swan ................. 455/412.1 |
| 7,567,661 | B1* | 7/2009 | Wood et al. ........... 379/201.02 |
| 2004/0203579 | A1* | 10/2004 | Comp ................. 455/406 |
| 2006/0246877 | A1* | 11/2006 | Kashanian et al. ....... 455/412.2 |
| 2007/0165801 | A1* | 7/2007 | Devolites et al. ....... 379/114.03 |

\* cited by examiner

*Primary Examiner*—Creighton Smith
(74) *Attorney, Agent, or Firm*—Toler Law Group (57) ABSTRACT

A system and method of storing contact information is disclosed. In a particular embodiment, the method includes receiving a request from a user at a web server of an Internet Protocol (IP) network to view call log data stored at a call log data store of the IP network. The method also includes issuing a request to obtain the call log data from the call log data store, wherein the call log data includes contact information associated with a call. The method also includes receiving a selection of the contact information from the user and sending the contact information to a network address book server of the IP network, where the contact information is stored in association with a network address book of the user.

14 Claims, 11 Drawing Sheets

SYSTEM AND METHOD OF STORING CONTACT INFORMATION

FIELD OF THE DISCLOSURE

The present disclosure is generally related to storing contact information.

BACKGROUND

Electronic communications are important to business and personal relationships. Individuals can make contact through a variety of media, such as land-line telephones, cellular telephones, e-mail, personal data assistants and other computing devices, as well as by meeting at physical locations. Each medium can have unique contact information, including, for example, home telephone numbers, cellular telephone numbers, e-mail addresses, home addresses, work addresses, web addresses, and the like. Maintaining contact information associated with multiple contacts can require a written or electronic store of contact information.

Paper-based address books are increasingly displaced by electronic versions. Yet, the variety of electronic contact information storage methods can present challenges. While contact information can be stored at individual devices, such as personal data assistants, cell phones, etc., they may not be replicated on all such devices. Updating and adding contact information to centralized storage systems can also be tedious. Manually entering contact information associated with each new contact can require a great deal of time and effort. Hence, there is a need in the art for an improved system and method of storing contact information.

DETAILED DESCRIPTION OF THE DRAWINGS

A system to store contact information is disclosed and includes a web server including a processor and a memory device accessible to the processor. The memory device includes a call log request module executable by the processor to obtain a call log entry from a call log data store via an Internet Protocol (IP) network in response to a request from a user device to view the call log entry, the call log entry including contact information associated with a call. Further, the memory device includes a network address book communication module executable by the processor to send the contact information to a network address book server via the IP network in response to a selection of the call log entry received from the user device.

In another embodiment, a system to store contact information is disclosed and includes a call server communicating with an Internet Protocol (IP) network to receive contact information related to a call. The call server includes a processor and a memory device accessible to the processor. Further, the call server includes a call log data store to store the contact information in a call log associated with a user. The memory device also includes a web server communication module executable by the processor to send the contact information to a web server via the IP network in response to a request from the web server to obtain call log data associated with the user.

In another embodiment, a method of storing contact information is disclosed and includes receiving a request from a user at a web server of an Internet Protocol (IP) network to view call log data stored at a call log data store of the IP network. The method also includes issuing a request to obtain the call log data from the call log data store, where the call log data includes contact information associated with a call. The method also includes receiving a selection of the contact information from the user and sending the contact information to a network address book server of the IP network. The contact information is stored in association with a network address book of the user.

In another embodiment, a method of storing contact information is disclosed and includes receiving contact information related to a call at a call log server of an Internet Protocol (IP) network. The method also includes storing the contact information at a call log data store in a call log associated with a user. The method also includes receiving a request to obtain call log data from a web server via the IP network and sending the contact information to the web server. The contact information is stored at a network address book server of the IP network.

In another embodiment, a method of storing contact information is disclosed and includes receiving a request at a user device to view a call log entry stored at a call log data store of an Internet Protocol (IP) network, where the call log entry includes contact information associated with a call. The method also includes sending the request to a web server via the IP network and receiving the call log entry from the web server, where the web server obtains the call log entry from a call log data store. The method also includes receiving a selection of the call log entry and issuing a command to the web server to store the contact information at a network address book server of the IP network, where the contact information is associated with a user network address book.

In another embodiment, a computer program embedded in a computer-readable medium is disclosed and includes instructions to obtain a call log entry from a call log data store via an Internet Protocol (IP) network in response to a request from a user device to view the call log entry, the call log entry including contact information associated with a call. The computer program also includes instructions to send the contact information to a web server via the IP network in response to a request from the web server to obtain call log data associated with the user.

In another embodiment, a computer program embedded in a computer-readable medium is disclosed and includes instructions to communicate with an Internet Protocol (IP) network to receive a call placed to a user. The computer program also includes instructions to store contact information associated with the call at a call log data store. Further, the computer program includes instructions to communicate with a web server via the IP network to receive a request to obtain the contact information. The computer program also includes instructions to send the contact information to the web server, wherein the contact information is stored at a network address book server of the IP network in response to a selection of the contact information by the user.

Figure 1:
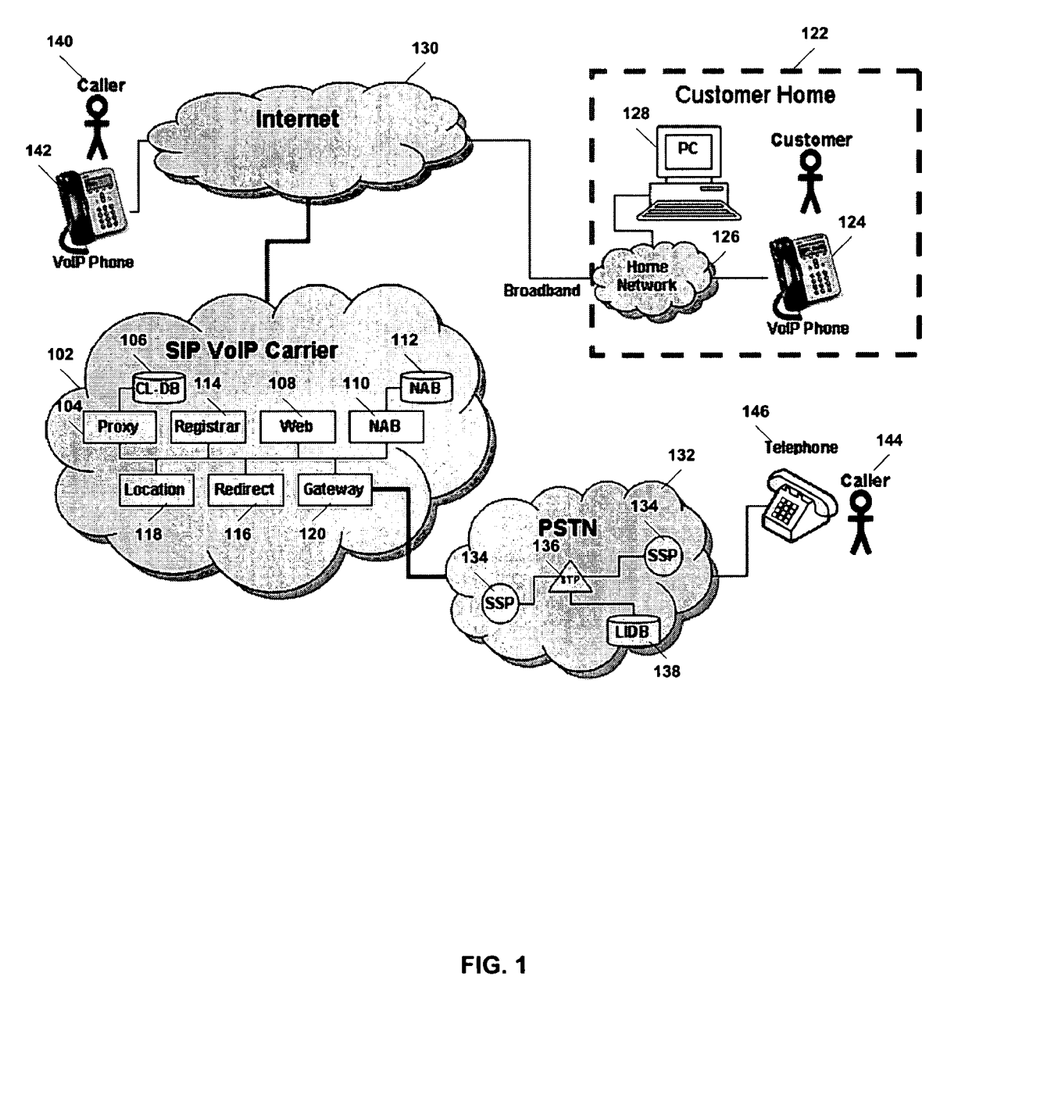
FIG. 1 is a block diagram illustrating a particular embodiment of a system to store contact information.

Referring to FIG. 1, an illustrative embodiment of a system to store contact information is illustrated and is generally designated 100. As shown, the system 100 can include an Internet Protocol (IP) network of a carrier, such as a Voice-over Internet Protocol (VoIP) network 102. The VoIP network 102 can include carrier equipment to provide VoIP services, for example, to a customer home 122. In a particular embodiment, the VoIP network 102 can include a call server, such as the proxy server 104, which can be coupled to a call log data store, such as the call log database 106. The proxy server 104 can receive calls placed to a customer home 122 via the Internet 130, a Public Switched Telephone Network (PSTN) 132, or any combination thereof. In an illustrative embodiment, the VoIP network 102 can include a VoIP-to-PSTN gateway 120 that provides an interface between the VoIP network 102 and the PSTN network 132 and allows calls to pass between the proxy server 104 and a service switching point (SSP) 134 of the PSTN 132.

The VoIP network 102 can also include a web server 108. In one embodiment, the web server 108 provides a web user interface that customers can access via the Internet 130 to manage account information, including call log data. The VoIP network 102 can also include a network address book server 110 coupled to a network address book data store 112 that includes contact information stored in network address books of a plurality of customers, users, subscribers, or any combination thereof.

In an illustrative embodiment, the VoIP network 102 can include a registrar server 114 that accepts requests from VoIP end-points to register their current network location and places registration information into a location service. Further, the VoIP network 102 can include a redirect server 116 that directs VoIP end-points to alternate network addresses that might be mapped to a requested VoIP end-point. The VoIP network 102 can also include a location server 118 used by the redirect server 116 and proxy server 104 to obtain information about a called party's possible network locations. In an illustrative embodiment, the location server 118 can map lists of bindings corresponding to address-of-record keys to zero or more contact addresses, such as telephone numbers.

The VoIP network 102 communicates with one or more user devices at a customer premise, such as the customer home 122, via the Internet 130. For example, the web server 108 can communicate with a customer computing device, such as a personal computer (PC) 128, and the proxy server 104 can communicate with a customer telephone device, such as a customer VoIP phone 124. In an illustrative embodiment, the VoIP network 102 can communicate with user devices via a customer premise network, such as a home network 126 that connects the user devices 124, 128 to the Internet 130. The home network 126 can be connected to the Internet 130 through a broadband connection that terminates at a modem, router, switch, or other customer premises equipment.

The VoIP network 102 facilitates communication between one or more callers 140, 144 and the customer home 122. For example, the proxy server 104 can receive a call originated by a caller 140 from an origination device, such as a caller VoIP phone 142. In another example, the proxy server 104 can receive a call originated by a caller 144 from a plain old telephone service (POTS) telephone 146 that communicates with the PSTN 132 via a service switching point 134. In a particular embodiment, the proxy server 104 determines a destination of each call, such as the customer VoIP phone 124, and routes the call to its destination. The proxy server 104 can route each call to a voice mail system, if the call is not answered at the destination device.

Each time the proxy server 104 receives a call, the proxy server 104 receives origination information associated with the caller, origination device, or any combination thereof. For example, the proxy server 104 can receive caller identification (caller ID) information stored in a line information database 138 with calls received via the PSTN 132. In another example, the proxy server 104 can obtain a caller name, location, or other origination information, from the location server 116 when receiving a call via the VoIP network 102. In a particular embodiment, the proxy server 104 can generate a call detail record (CDR) based on the origination information related to a call. The proxy server 104 can store the CDR in a call log associated with a customer in the call log database 106.

In another particular embodiment, the proxy server 104 can route calls from the user VoIP phone 124 to destination devices, such as the caller VoIP phone 142 or POTS telephone 146. In this embodiment, the proxy server 104 can obtain call log data associated with the destination devices 142, 146 of the outgoing calls. Further, the proxy server 104 can store call log data associated with the outgoing calls as one or more call detail records or other type of call log entries at the call log database 106.

A customer can issue a request to view call log data, such as call detail records associated with incoming calls, outgoing calls, or any combination thereof, by accessing the web server 108 via the Internet 130, using the PC 128, a laptop computer, the customer VoIP phone 124, a personal data assistant, a wireless access protocol phone, a cellular phone, or other customer computing device that operates a web browser configured to communicate with the web server 108. In an illustrative embodiment, the web server 108 can support a web user interface (WUI) that allows the customer to manage call log data via a quick address book builder application running at the web server 108, the PC 128, or any combination thereof.

Figure 8:
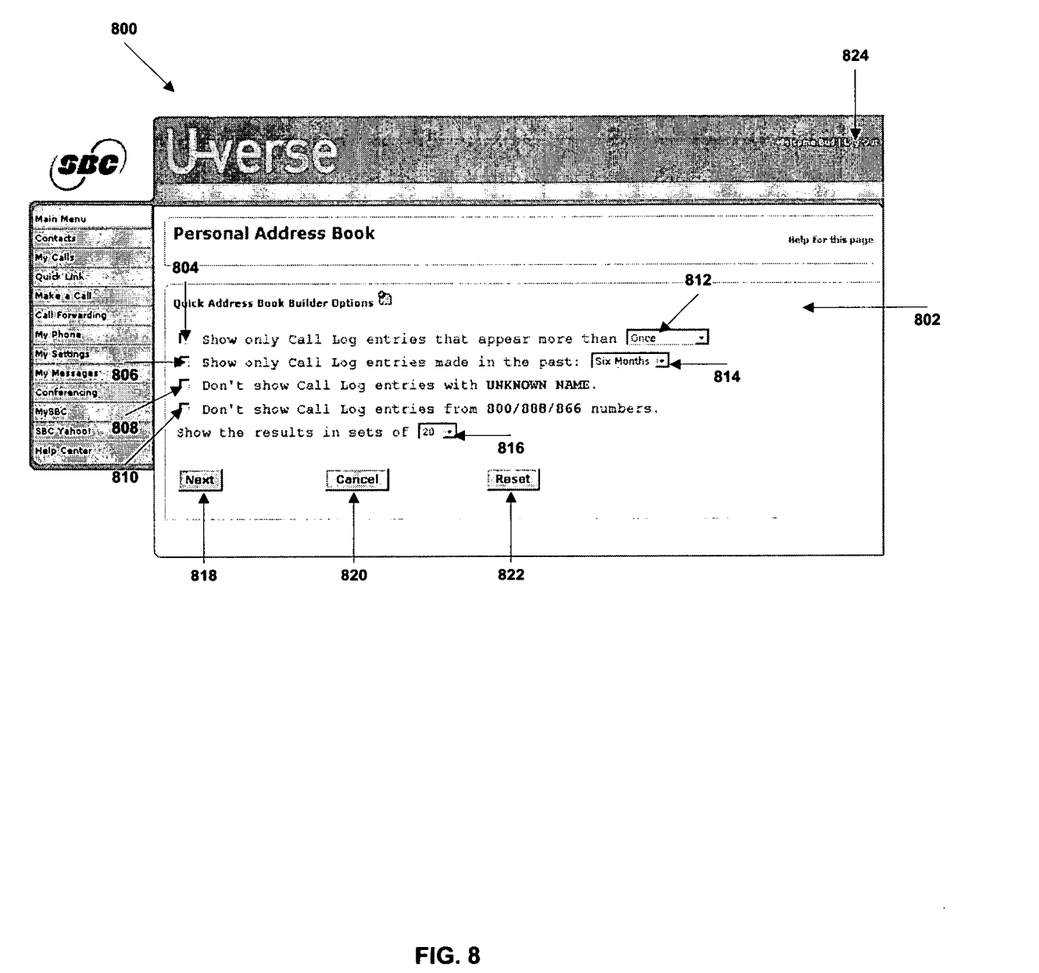
FIG. 8 is a diagram of an illustrative embodiment of a graphical user interface (GUI) to store contact information.
Figure 9:
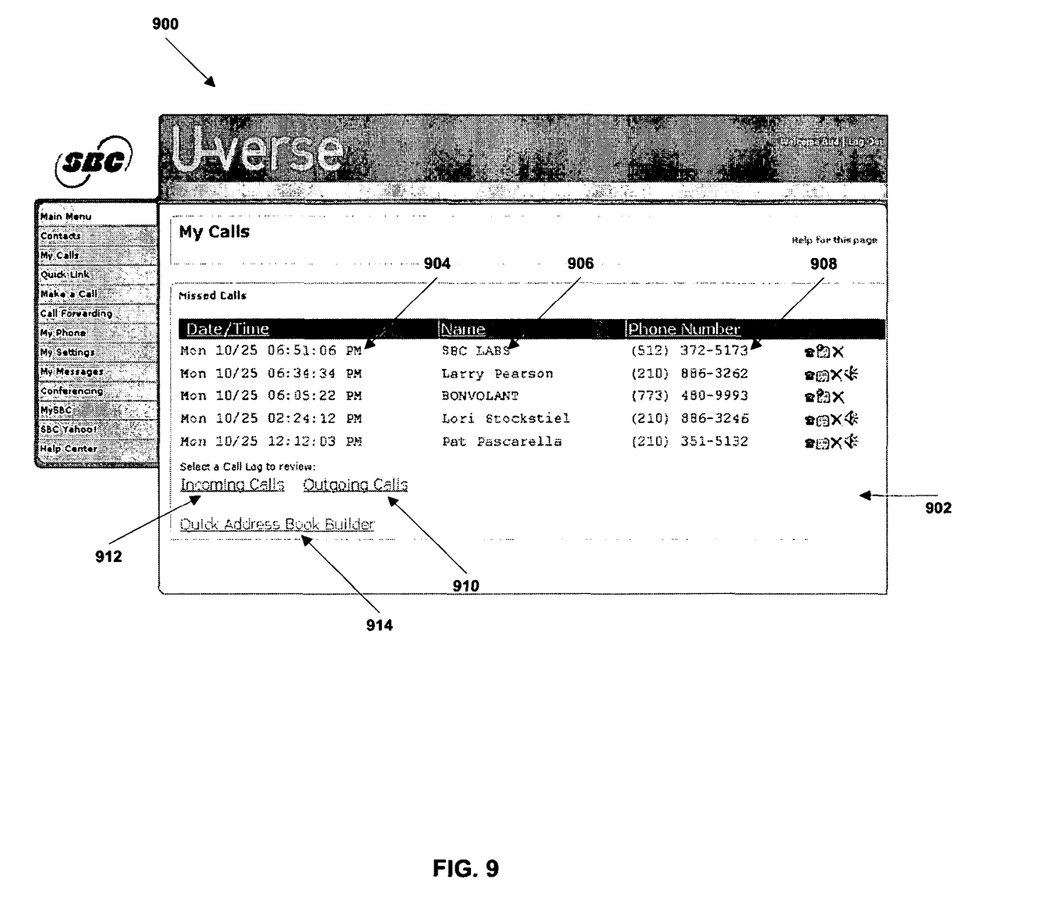
FIG. 9 is a diagram of an illustrative embodiment of a second graphical user interface (GUI) to store contact information.

The web server 108 can request the call log data from the proxy server 104 in response to a customer request received at the web server 108. The proxy server 104 retrieves the call log data from the call log database 106 and sends the call log data to the web server 108. The web server 108, in turn, sends the call log data to the PC 128. In one embodiment, the call log data can be organized into a call log graphical user interface (GUI) that shows the call detail records. An example of a call log GUI is illustrated in FIG. 9. In another embodiment, the web server 108 can allow the customer to search the call log data via a search GUI and to view one or more call detail records or portions of call log data that match search criteria selected by the user. An example of a search GUI is illustrated in FIG. 8.

In an illustrative, non-limiting embodiment, the web server 108 can contribute additional information to the call log data in one or more call detail records before sending the call detail record(s) to the PC 128. For example, the web server 108 can obtain directory information corresponding to a telephone number or name in a call detail record from reverse directory assistance (RDA), or from a reverse telephone search source or other directory information accessible via the Internet 130.

The web server 108 can populate a call detail record with the additional information before sending the call detail record to the PC 128.

In a particular embodiment, the customer can select call log data received at the PC 128 to be added to the customer's network address book. For example, the customer can select one or more of the call detail records received at the PC 128 via a quick address book builder GUI, such as the GUI illustrated in FIG. 10. The web server can send one or more portions of contact information in a selected call detail record to the network address book server 110. The network address book server 110 can store the contact information at the network address book data store 112 in the network address book associated with the customer.

In an illustrative embodiment, the web server can determine whether call log data, additional directory information, or any combination thereof, which is associated with a call detail record is included in a network address book associated with the customer at the network address book data store 112. If the call log data, additional information, or any combination thereof, is already included in the network address book, the quick address book builder can indicate that the contact information in the call detail record is already present in the network address book. On the other hand, if a portion of the contact information is not included in the network address book, the quick address book builder can give the customer an option to update contact information in the network address book with the portion of contact information.

Figure 2:
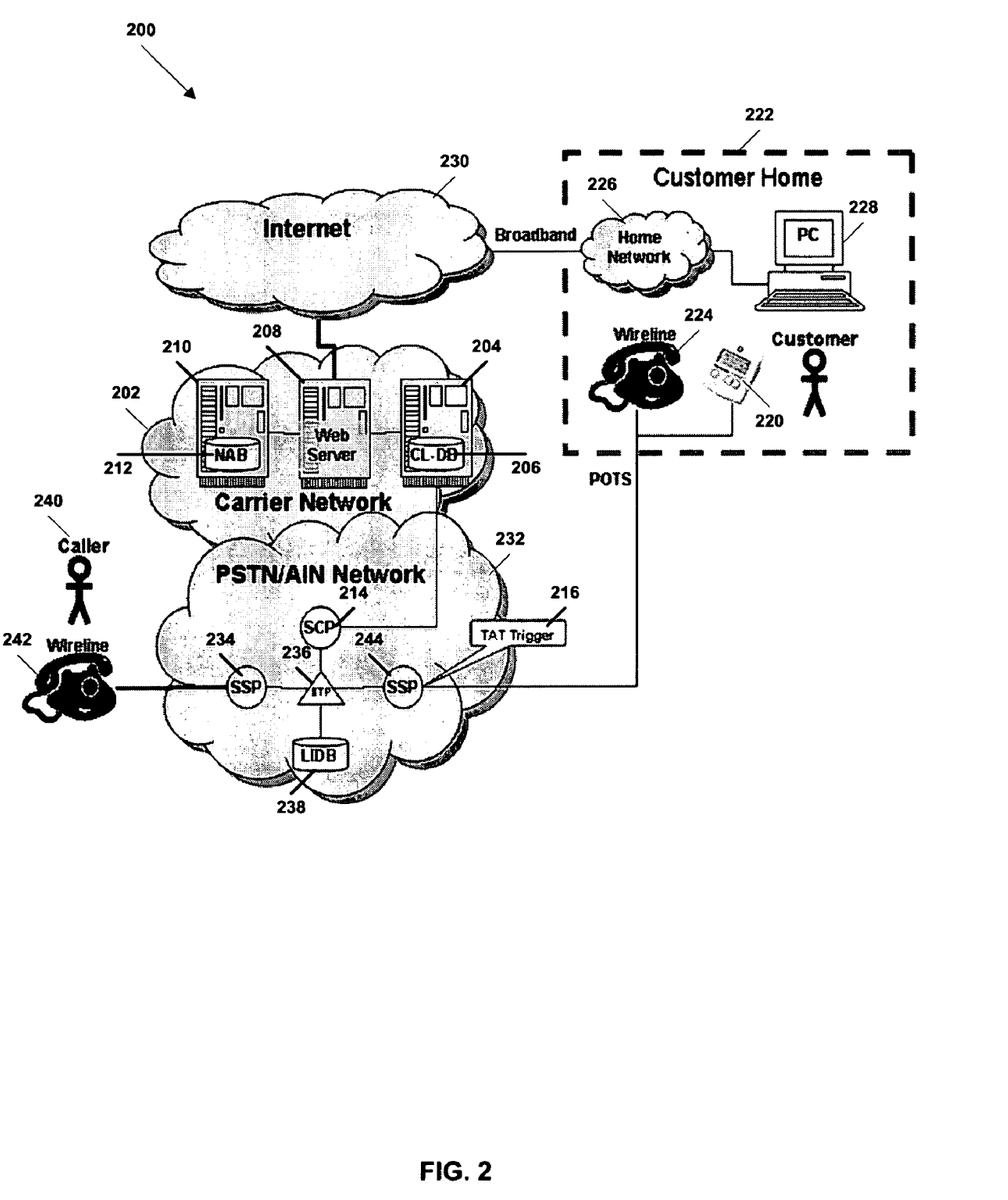
FIG. 2 is a block diagram illustrating a second particular embodiment of a system to store contact information

Referring to FIG. 2, a second illustrative embodiment of a system to store contact information is illustrated and is generally designated 200. As shown, the system 200 can include an Internet Protocol (IP) network, such as an IP network 202 that is internal to a Public Switched Telephone Network (PSTN) carrier or other carrier. In a particular embodiment, the carrier IP network 202 can include a call log server 204, which can include a call log database 206. The call log server 204 can receive origination information associated with calls placed to a customer home 222 via the Internet 230, a PSTN 232, or any combination thereof. The call log server 204 can store the origination information in a call log associated with the customer in the call log database 206. The carrier IP network 202 can also include a web server 208 and a network address book server 210 that includes a network address book data store 212.

The carrier IP network 202 communicates with one or more devices at the customer home 222, via the Internet 230. For example, the web server 208 can communicate with a user computing device, such as a personal computer (PC) 228. In an illustrative embodiment, the web server 208 can communicate with the PC 228 via a home network 226 that connects to the Internet 230. The home network can be connected to the Internet 230 through a broadband connection that terminates at a modem, router, switch, or other customer premises equipment.

In a particular embodiment, a caller 240 can place a call using the caller POTS phone 242 that is coupled to a first service switching point (SSP) 234 of the PSTN 232. The call can be routed by a service switching point (SSP) 234 of the PSTN 232 to the customer POTS phone 224 via a second SSP 244. In an illustrative embodiment, the customer POTS phone 224 can be coupled to a caller identification (caller ID) display device 220 that displays caller ID information received with the call from a line information database 238 of the PSTN 232.

The call log server 204 can receive origination information related to the caller 240, caller POTS phone 242, or any combination thereof. For example, a terminating attempt trigger 216 can be configured on the customer's line at the second SSP 244, and the origination information can be intercepted at a service control point (SCP) 214 and forwarded to the call log server 204. The call log server 204 can store the origination information at the call log data store 206. In an illustrative embodiment, the call log server 204 can receive caller identification (caller ID) information stored in the line information database 238 when a call is placed to the customer POTS phone 224 via the PSTN 232. The call log server 204 can generate a call detail record (CDR) based on the origination information and store the CDR in the call log database 206.

A customer can issue a request to view call log data, such as call detail records associated with incoming calls, outgoing calls, or any combination thereof, by accessing the web server 208, using the PC 228 or other computing device. The web server 208 can request the call log data from the call log server 204 in response to the customer request. The call log server 204 retrieves the call log data from the call log database 206 and sends the call log data to the web server 208. The web server 208, in turn, sends the call log data to the customer at the PC 228.

In a particular embodiment, the customer can select call log data received at the PC 228 to be added to the customer's network address book. For example, the customer can select one or more of the call detail records received at the PC 228 via a quick address book builder, and the web server 208 can send the contact information associated with the call detail record(s) to the network address book server 210. The network address book server 210 can store the contact information at the network address book data store 212 in the network address book associated with the customer.

Figure 3:
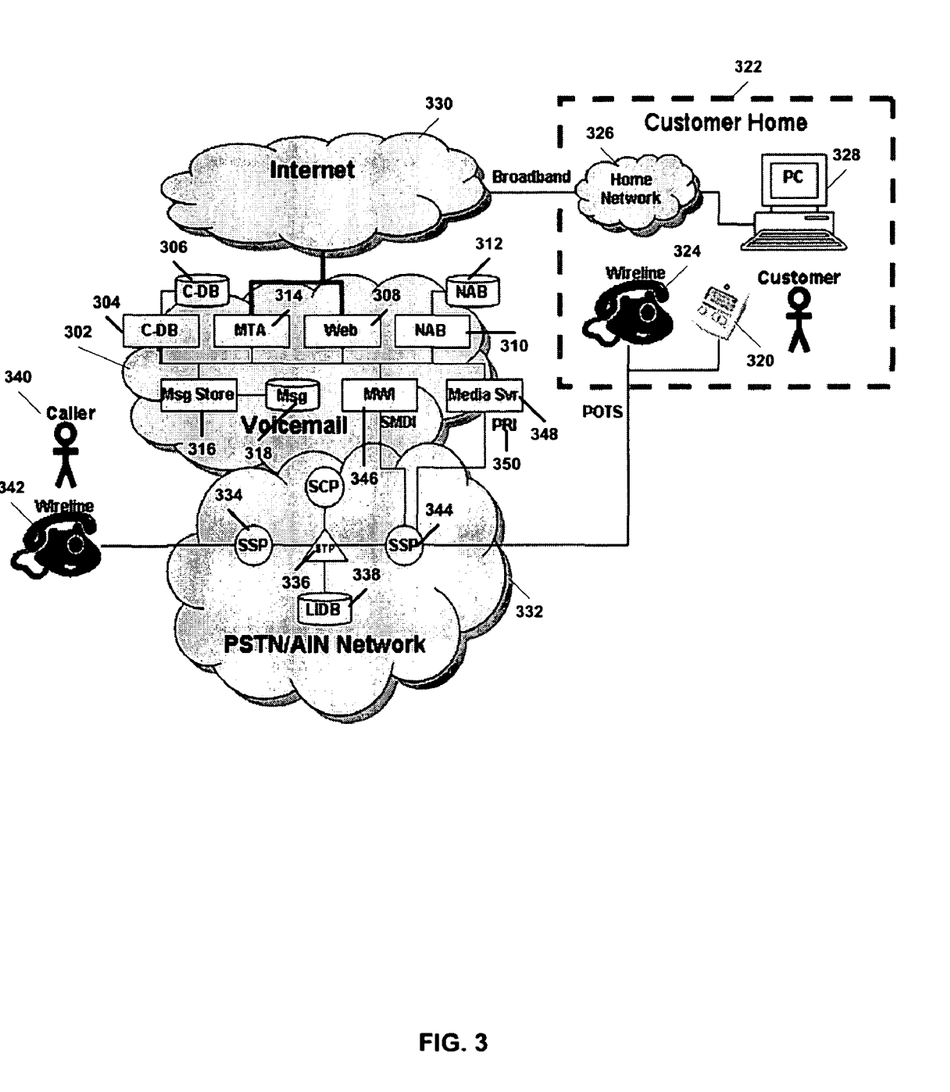
FIG. 3 is a block diagram illustrating a third particular embodiment of a system to store contact information.

Referring to FIG. 3, an illustrative embodiment of a system to store contact information is illustrated and is generally designated 300. As shown, the system 300 can include an Internet Protocol (IP) network, such as an IP network 302 that is internal to a Public Switched Telephone Network (PSTN) carrier or other carrier. In a particular embodiment, the carrier IP network 302 can include a call log server 304, which can be coupled to a call log database 306. The call log server 304 can receive origination information associated with calls placed to a customer home 322 via the Internet 330, a PSTN 332, or any combination thereof, and can store the origination information in the call log database 306. The carrier IP network 302 can also include a web server 308. Further, the carrier IP network 302 can include a network address book server 310 coupled to a network address book data store 312 that includes contact information stored in network address books of a plurality of customers, users, subscribers, or any combination thereof.

In an illustrative embodiment, the carrier IP network 302 can include a message transfer agent (MTA) server 314 that receives and processes e-mail from the Internet 330 and sends messages bound for the customer to a message storage server 316 for storage at a message data store 318. Additionally, the message storage server 316 can implement a message storage interface to receive voice or facsimile messages and store the messages at the message store 318. Further, the carrier IP network 302 can include a message waiting indicator (MWI) server 346 that interfaces with the service switching points 334, 344 and notifies a customer that voice mail messages to the customer are stored at the message store 316, for example, by producing a stuttered dial tone at the customer POTS phone 324 or by illuminating a light at the customer POTS 324 phone or other customer device.

The carrier IP network 302 can also include a media server 348 that implements a telephone user interface for callers and customers. In one embodiment, the media server 348 can connect to a service switching point (SSP), such as the second SSP 344, of the PSTN 332 via an Intelligent Services Digital Network (ISDN) line. The media server 348 sees calls via a primary rate interface (PRI) 350 when the calls are forwarded from a called party telephone, such as the customer POTS phone 324, to the voice mail system 302.

The carrier IP network 302 communicates with one or more devices at the customer home 322, via the Internet 330. For example, the web server 308 can communicate with a customer computing device. In an illustrative embodiment, the web server 308 can communicate with the PC 328 via a home network 326 that connects to the Internet 330. The home network 326 can be connected to the Internet 330 through a broadband connection that terminates at a modem, router, switch, or other customer premises equipment.

In a particular embodiment, a caller 340 can place a call using the caller POTS phone 342 that is coupled to a first service switching point (SSP) 334 of the PSTN 332. The call can be routed by a service switching point (SSP) 334 of the PSTN 332 to the customer POTS phone 324 via the second SSP 344. In an illustrative embodiment, the customer POTS phone 324 can be coupled to a caller identification (caller ID) display device 320 that displays caller ID information received with the call from a line information database 338 of the PSTN 332.

The call log server 304 can receive origination information associated with the caller 340, origination device, or any combination thereof. For example, the media server 348 can provide a caller ID interface in a call setup between the caller POTS phone 342 and itself after the phone call is forwarded from the customer POTS phone 324. The media server 348 can forward the caller ID information to the call log server 304. In a particular embodiment, the call log server 304 can generate a call detail record (CDR) based on the caller ID information. The call log server 304 can store the CDR in a call log associated with the customer, a device, or any combination thereof, in the call log database 306.

A customer can issue a request to view call log data, such as call detail records associated with incoming calls, by accessing the web server 308, using the PC 328 or other computing device. The web server 308 can request the call log data from the call log server 304 in response to the user request. The call log server 304 retrieves the call log data from the call log database 306 and forwards the call log data to the web server 308. The web server 308, in turn, forwards the call log data to the PC 328. In one embodiment, the call log data can be organized by the web server 308, the PC 328, or any combination thereof, into a call log graphical user interface (GUI) that shows the call detail records. In another embodiment, the web server 308 can allow the user to search the call log data via a search GUI and to view one or more call detail records or portions of call log data that match search criteria selected by the user.

In a particular embodiment, the customer can select call log data received at the PC 328 to be added to the customer's network address book. For example, the customer can select one or more of the call detail records received at the PC 328 via a quick address book builder, and the web server can send the contact information included in the call detail record(s) to the network address book server 310. The network address book server 310 can store the contact information at the network address book data store 312 in the network address book associated with the customer.

Figure 4:
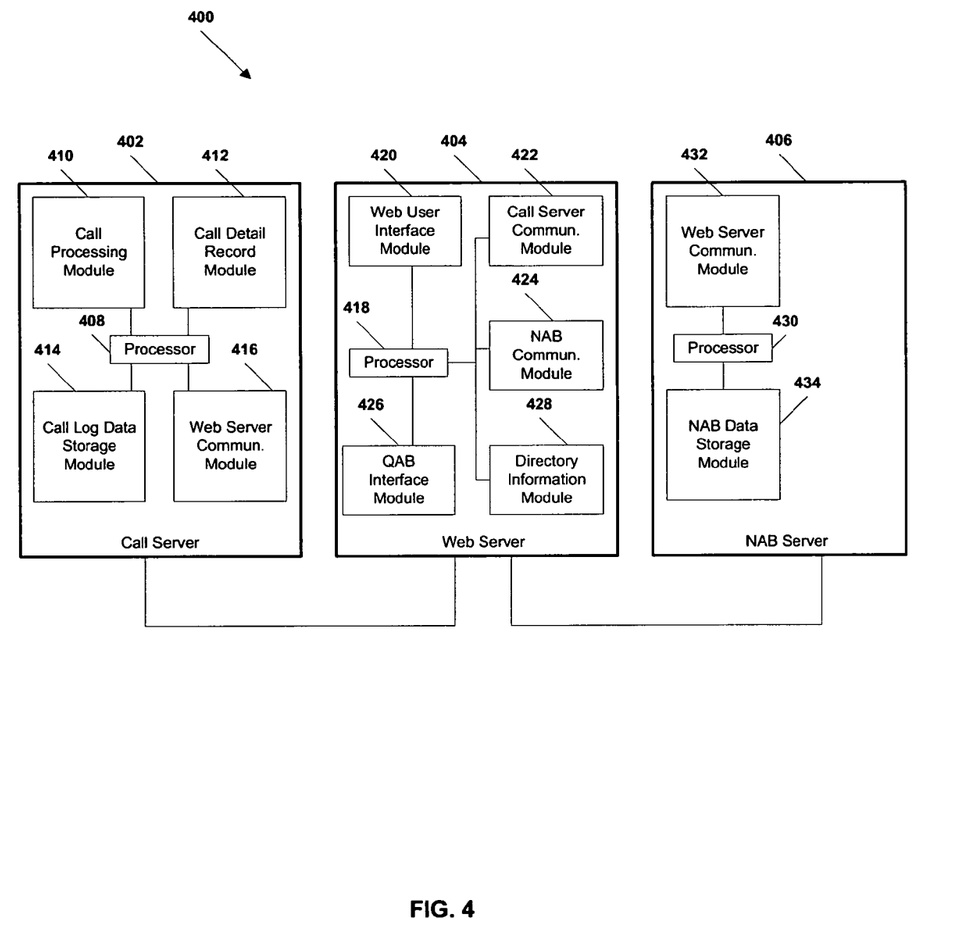
FIG. 4 is a block diagram illustrating a fourth particular embodiment of a system to store contact information.

Referring to FIG. 4, a fourth particular embodiment of a system to store contact information is illustrated and is designated generally at 400. The system 400 can include a call server 402, a web server 404, and a network address book server 406, within an Internet Protocol (IP) carrier network. In a particular embodiment, the call server 402 can include a call server processor 408 and a plurality of modules 410-416 executable by the call server processor 408. For example, the call server 402 can include a call processing module 410 that is executable by the call server processor 408 to receive and route calls from caller telephones to customer telephones via the carrier IP network. The call server can also include a call detail record module 412 that is executable by the call server processor 408 to receive origination information associated with a call placed to a customer and to arrange the origination information into a call detail record that is stored at a call log data storage module 414. The call server can also include a web server communication module 416 that is executable by the call server processor 408 to receive requests for call log data from the web server 404 and to send requested call log data to the web server 404 in response to such requests.

The web server 404 can include a web server processor 418 and a plurality of modules 420-428 executable by the web server processor 418. For example, the web server 404 can include a web user interface module 420 that is executable by the web server processor 418 to provide an interface, such as a web portal, that allows users to interact with the web server 404 via the Internet to request call log data. The web server 404 can also include a call server communication module 422 that is executable by the web server processor 418 to request and receive such call log data from the call server 402. Further, the web server 404 can include a network address book (NAB) server communication module 424 that is executable by the web server processor 418 to communicate contact information selected by a user from call detail records or other call log entries to the network address book server 406.

In a particular embodiment, the web server 404 can include a quick address book builder (QAB) interface module 426 that is executable by the web server processor 418 to provide a graphical user interface (GUI) that allows users to select contact information from call detail records or other types of call log entries to be stored at the network address book server 406. In an illustrative embodiment, the web server 404 can include a directory information retrieval module 428 that is executable by the web server processor 418 to obtain directory information related to contact information in a call detail record or other type of call log entry from a directory information source and to populate the call detail record or call log entry with the directory information before the call detail record or call log entry is sent to the user.

The network address book (NAB) server 406 can include a NAB server processor 430 and a web server communication module 432 that is executable by the NAB server processor 430 to receive contact information selected by a user from the web server 404 and to store the contact information in a network address book associated with the user in a NAB data storage module 434.

Figure 5:
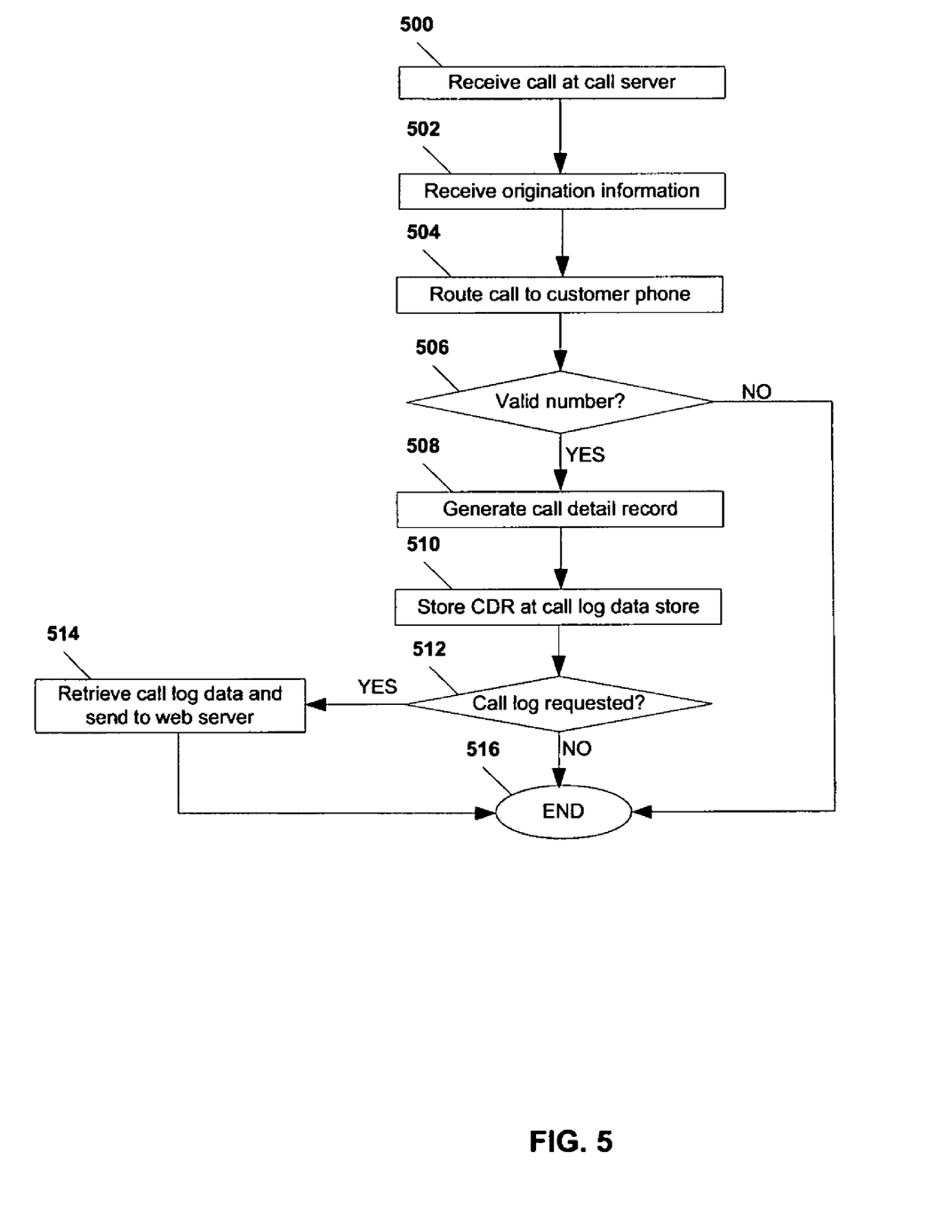
FIG. 5 is a flow diagram illustrating a particular embodiment of a method of storing contact information.

Referring to FIG. 5, a particular embodiment of a method of storing contact information is illustrated. At block 500, a call server of an Internet Protocol (IP) network receives a call from a caller telephone to a customer telephone. In an illustrative embodiment, the IP network can be a Voice-over Internet Protocol (VoIP) network, and the call can be placed from a caller VoIP phone to a customer VoIP phone. In another embodiment, the call can be placed from a caller plain old telephone service (POTS) phone or a customer VoIP phone via the VoIP network.

Moving to block 502, the call server receives origination information associated with the call. For example, the call server can receive caller identification (caller ID) information from a line information database with a call received via a public switched telephone network (PSTN). Alternatively, the call server can receive origination information from a location server with a call received via the VoIP network. Continuing to block 504, the call server routes the call to the customer phone. In an illustrative embodiment, the call server can route the call to a customer VoIP phone via a home network at the customer premise.

Proceeding to decision step 506, in a particular embodiment, the call server determines whether a valid origination telephone number has been received with the origination information. If the origination information does not contain a valid origination telephone number, e.g., if the number is unknown, private, or blocked, the method terminates at 516. Conversely, if the origination information contains a valid origination telephone number, the method moves to block 508, and the call server can generate a call detail record based on the origination information. The method continues to block 510, and the call server stores the call detail record at a call log data store that is coupled to or embedded within the call server.

Advancing to decision step 512, in a particular embodiment, the call server can determine whether it has received a request for a call log, for example, from a web server that has received a request to view call log data from a user. If the call server does not receive a request for the call log, the method terminates at 516. On the other hand, if the call server has received a request for a call log, the method moves to block 514, and the call server retrieves call log data associated with the user, which can include the call detail records, and sends the call log data to the web server. The method then terminates at 516.

Figure 6:
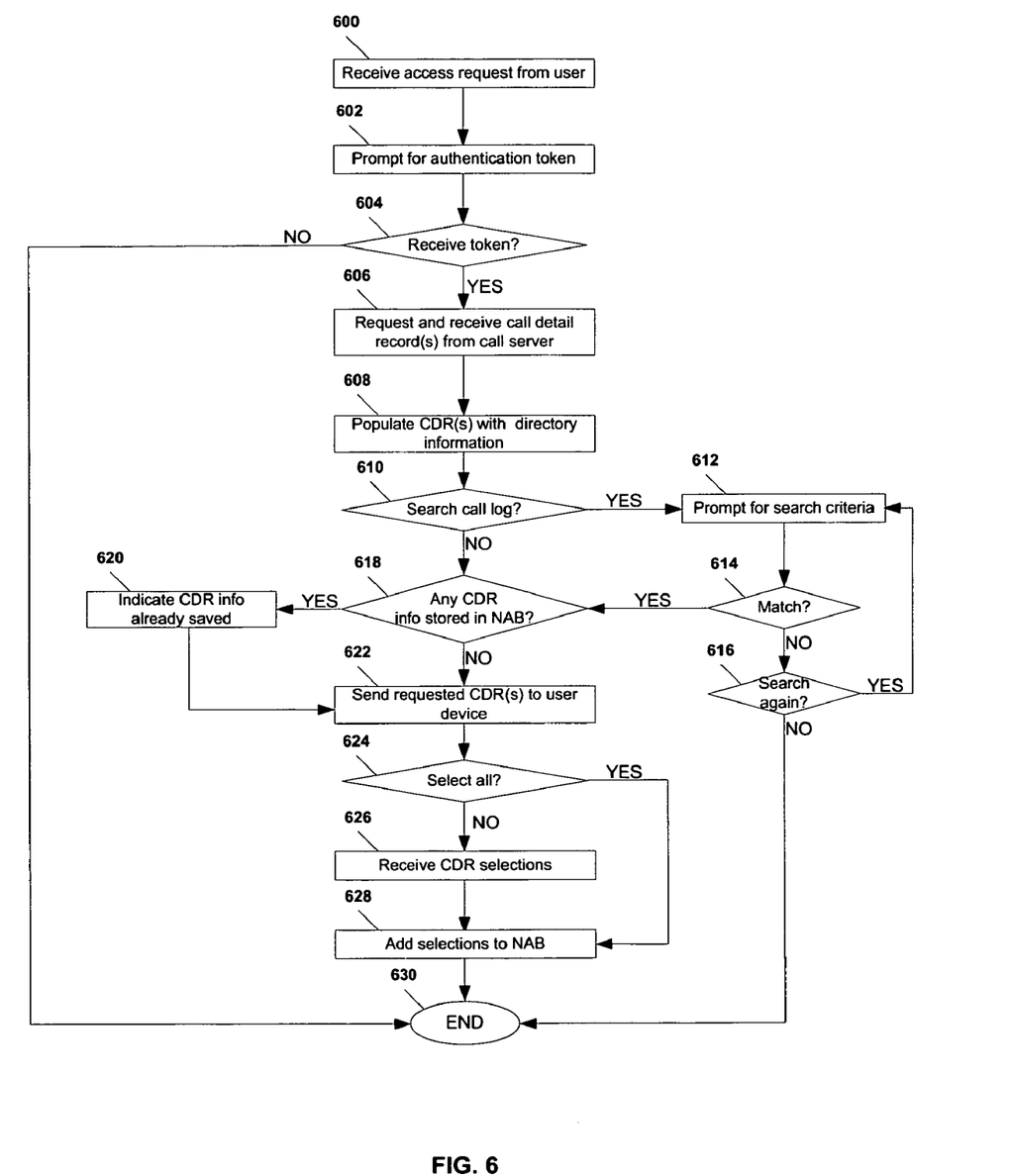
FIG. 6 is a flow diagram illustrating a second particular embodiment of a method of storing contact information.

Referring to FIG. 6, a second illustrative embodiment of a method of storing contact information is illustrated. At block 600, a web server within an Internet Protocol network receives a request from a user via a user device, such as a personal computing device, a laptop computing device, a personal data assistant, or other computing device, to access a call log associated with the user via a web interface maintained by the web server. Moving to block 602, in a particular embodiment, the web server can prompt the user to input an authentication token. At decision step 604, the web server can determine whether it has received the authentication token. If the web server does not receive the authentication token, the method terminates at 630. Whereas, if the web server receives the authentication token, the method continues to block 606.

Proceeding to block 606, the web server requests and receives call detail records associated with the user from a call log data store. For example, the web server can request the call detail records from a call server or call log server of the IP network, which is coupled to or integrated with the call log data store. Moving to block 608, in a particular embodiment, the web server can populate the call detail record(s) with directory information. The web server can obtain directory information related to contact information such as names, locations, telephone numbers, or any combination thereof, within one or more of the call detail records.

Advancing to decision step 610, the web server determines whether it receives a command or request from the user to search the call detail records. If the web server does not receive a request to search the call detail records, the method can proceed to decision step 618, and the web server can determine whether contact information in any call detail record is already stored in the user's address book at a network address book data store. If no contact information in any call detail record is stored in the user's address book, the method proceeds to block 622. On the other hand, if contact information in one or more call detail records is already stored in the user's network address book, the method can move to block 620, and the web server can indicate that the contact information is already stored. The method then continues to block 622. At block 622, the web server sends call detail records associated with all incoming calls to the user device. In a particular embodiment, the web server can also send call detail records associated with outgoing calls to the user device. Call detail records can be arranged in a call log graphical user interface GUI, such as the GUI illustrated in FIG. 9.

Returning to decision step 610, if the web server receives a request to search the call detail records, the method moves to block 612, and the web server issues a prompt to the user device to submit or select search criteria. An example of a graphical user interface (GUI) to enter or select search criteria is illustrated in FIG. 8. Continuing to decision step 614, the web server determines if there are any call detail records that match the search criteria entered or selected by the user. If no matches are found, the method moves to decision step 616, and the web server can determine whether the user wishes to search again. If the user does not wish to search again, the method terminates at 630. Whereas, if the user wishes to search again, the method returns to block 612.

Returning to decision step 614, if one or more call detail records matches the search criteria submitted or selected by the user, the method proceeds to decision step 618, and the web server can determine whether contact information in any of the matching call detail records is already stored in the user's address book at a network address book data store. If no contact information in the matching call detail records is stored in the user's address book, the method proceeds to block 622. On the other hand, if contact information in one or more of the matching call detail records is already stored in the user's network address book, the method can move to block 620, and the web server can indicate that the contact information is already stored. The method then continues to block 622, and the web server sends the matching call detail records to the user device. In one embodiment, the call detail records can be arranged in a call log graphical user interface GUI, such as the GUI illustrated in FIG. 9.

Figure 10:
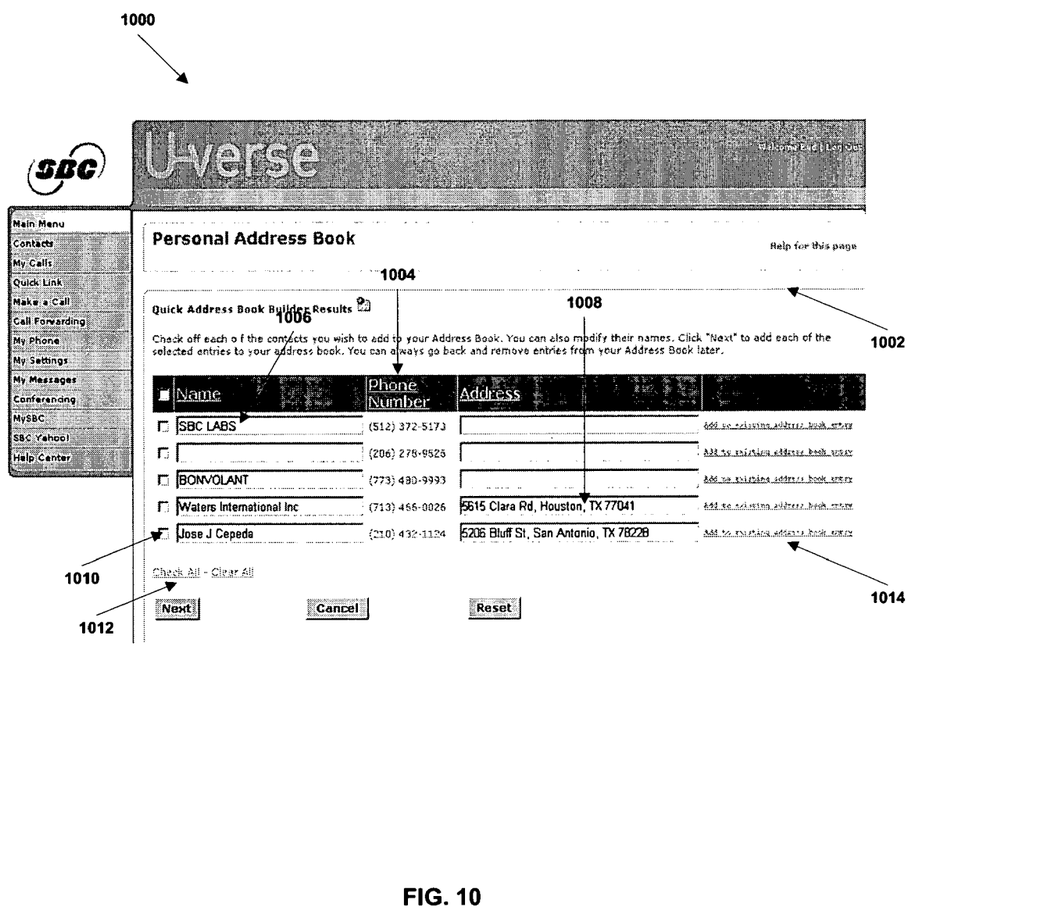
FIG. 10 is a diagram of an illustrative embodiment of a third graphical user interface (GUI) to store contact information.

The user can select call log data of one or more of the call detail records to be stored in the user's network address book. For example, the user can select a quick address book builder interface from the call log GUI. An example of a quick address book builder interface is illustrated in FIG. 10. Advancing to decision step 624, in an illustrative embodiment, the web server can determine whether the user has selected all the call detail records displayed at the user device. If the web server receives a selection of all the call detail records, the method proceeds to block 628. Whereas, if the web server does not receive a selection of all the call detail records, the method continues to block 626, and the web server receives the user's selections of call detail records whose data is to be saved to the user's network address book. The method then proceeds to block 628. At block 628, the web server communicates call log data from the selected call detail records to a network address book data store to be saved in association with the user's network address book. The method terminates at 630.

Figure 7:
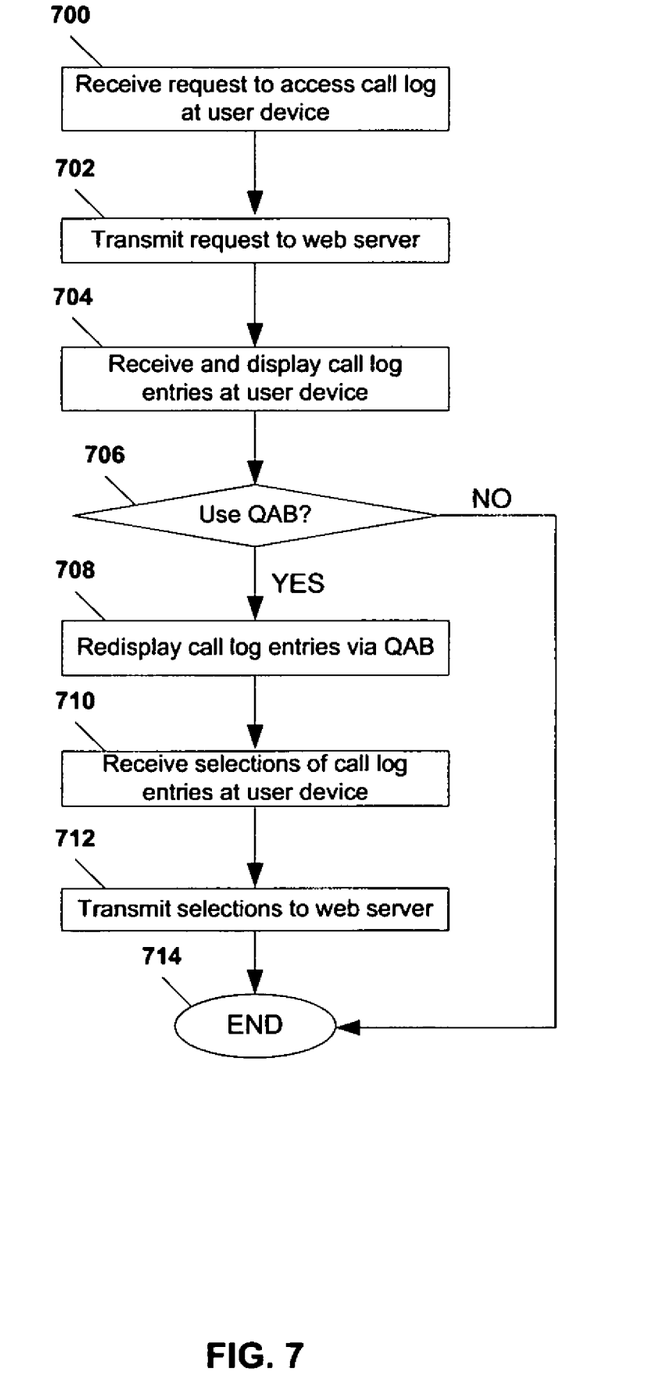
FIG. 7 is a flow diagram illustrating a third particular embodiment of a method of storing contact information.

Referring to FIG. 7, a third illustrative embodiment of a method of storing contact information is illustrated. At block 700, a user device receives a request to access a call log. Moving to block 702, the user device transmits the request to a web server of an Internet Protocol (IP) network via the Internet. Proceeding to block 704, the user device receives call log entries related to incoming calls, outgoing calls, or any combination thereof, and displays the call log entries. In a particular embodiment, the call log entries can include call detail records that display a name, address, telephone number, other origination information, or any combination thereof, associated with a caller.

Continuing to decision step 706, the user device can determine whether it has received a request to use a quick address book builder (QAB) interface. The QAB interface allows the user to select call log entries to be saved to the user's network address book at a network address book data store within the IP network. If the user device determines has not received a request to use the QAB interface, the method terminates at 714. On the other hand, if the user device receives a request to use the QAB interface, the method advances to block 708, and the call log entries can be displayed within the QAB interface. An example of a QAB interface is illustrated in FIG. 10.

Proceeding to block 710, the user device receives the user's selections of one or more call log entries displayed within the QAB. Continuing to block 712, the user device transmits the user's selections to the web server. In a particular embodiment, the web server sends the call log data associated with each selected call log entry to a network address book server, which stores the data at the network address book data store. The method terminates at 714.

Though the aspects of the disclosed methods have been presented in a certain order, for ease of description, certain portions of the methods may be performed in a different order or simultaneously.

Referring to FIG. 8, a particular embodiment of a graphical user interface (GUI) to store contact information is illustrated and designated generally at 800. The GUI 800 includes a search criteria region 802 that can display selectable criteria to search call log entries. The GUI 800 can include selectable indicators, such as a series of check-boxes 804-810, to allow a user to indicate selections. For example, the GUI 800 can include a first selectable indicator 804 that a user may choose to view call log entries that appear more than certain number of times. In an illustrative embodiment, a user can select the threshold number of times from a drop-down or pull down menu 812.

Further, the GUI 800 can include a second selectable indicator 806 that a user may choose to view call log entries related to incoming or outgoing calls within a past period of time. In an illustrative embodiment, a user can select the threshold number of times from a drop-down or pull down menu 814. In addition, the GUI 800 can include a third selectable indicator 808 that a user may choose to not view call log entries having an unknown caller name. Moreover, the GUI 800 can include a fourth selectable indicator 810 that a user may choose to not view call log entries from toll free telephone numbers.

In a particular embodiment, the GUI 800 can include additional selectable indicators 816-822. For instance, the GUI 800 can include a menu 816 that allows a user to select a number of call log entries to be displayed on a single call log page. The GUI 800 can also include a selectable indicator of a NEXT option 818 to return search results according to selected criteria. Further, the GUI 800 can include a selectable indicator of a CANCEL option 820 to exit the search GUI 800. In addition, the GUI 800 can also include a selectable indicator of a RESET option 822 to reset the check-boxes 804-810 to an unselected status.

Referring to FIG. 9, a particular embodiment of a second graphical user interface (GUI) to store contact information is illustrated and designated generally at 900. The GUI 900 includes a call log display region 902 that can display data associated with call log entries. For example, the GUI 900 can include event information 904, such as a day, date, time, or any combination thereof, at which a call was placed or received. Further, the GUI 900 can display a name 906 of a caller or called party. In addition, the GUI 900 can display a telephone number 908 of the caller or called party.

In an illustrative embodiment, the GUI 900 can include selectable indicators of options to manipulate the call log entries displayed in the call log display region 902. For example, the GUI 900 can include a first selectable option indicator 910 that a user can select to view only call log entries related to outgoing calls. Further, the GUI 900 can include a second selectable option indicator 912 that a user can select to view only call log entries related to incoming calls. In another embodiment, the GUI 900 can include a third selectable option indicator 914 to display call log entries in a quick address book builder interface that allows the user to select call log entries whose data is to be added to the user's network address book.

Referring to FIG. 10, a particular embodiment of a third graphical user interface (GUI) to store contact information is illustrated and designated generally at 1000. The GUI 1000 can include a quick address book builder region 1002. The quick address book builder region 1002 can include a telephone number 1004 of a caller or called party. In a particular embodiment, the GUI 1000 can include an editable name 1006 of the caller or called party. Further, the GUI 1000 can include an editable address 1008 of the caller or called party. In an illustrative embodiment, the editable name 1006, editable address 1008, or any combination thereof, can be obtained by a web server from directory information and populated within the call log entry displayed by the GUI 1000.

In a particular embodiment, the GUI 1000 can include selectable indicators, such as check-boxes 1010, that allow a user to select individual call log entries whose data is to be stored in a network address book associated with the user. Further, the GUI 1000 can include a SELECT-ALL indicator 1012 that allows the user to select all call log entries displayed by the GUI 1000. In addition, the GUI 1000 can include an update indicator 1014 that allows a user to change or replace contact information already stored in the network address book with data in a call log entry displayed by the GUI 1000.

In conjunction with the configuration of structure described herein, the system and method disclosed allow a customer of a network address book system to add contact information to a network address book associated with the user by selecting call detail records or other call log entries stored by a server of an Internet Protocol (IP) network. In a particular embodiment, a call server or call log server within the IP network can receive origination or destination data associated with incoming or outgoing calls and store the origination or destination data at a call log data store coupled to or embedded within the call server or call log server. The call log data store can store the origination or destination data as one or more call detail records or other type of call log entries.

A customer can request access to the call log entries by using a computing device to communicate with a web server within the IP network. The web server can request call log data associated with call log entries requested by the user and can transmit the call log entries to the computing device where they are displayed to the customer. In an illustrative embodiment, the call log entries can be displayed via a call log graphical user interface (GUI). The customer can select one or more of the call log entries, and data associated with the selected call log entries can be transmitted by the web server to a network address book server within the IP network. The network address book server can store the data at a network address book data store that is coupled to or integrated with the network address book server.

Figure 11:
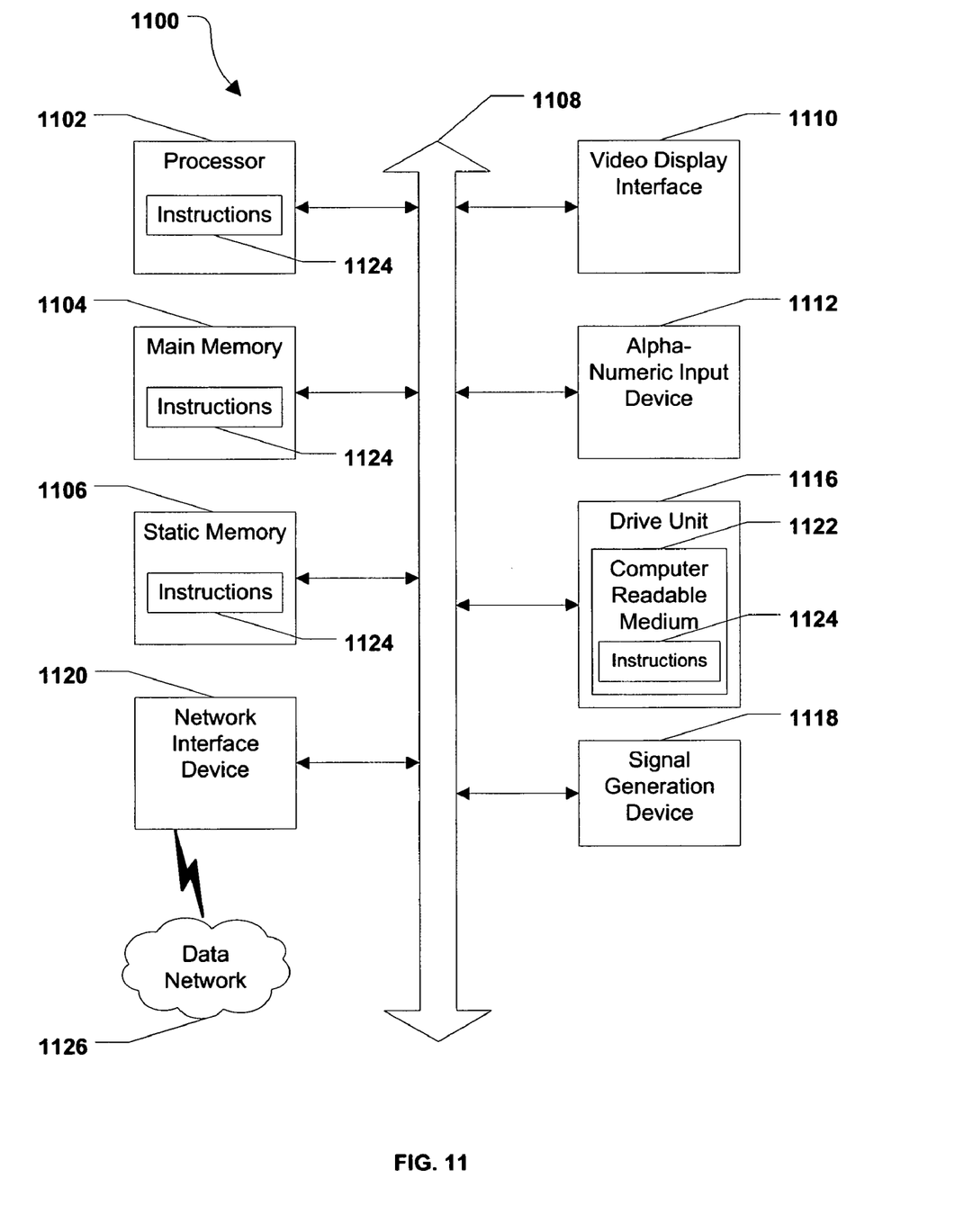
FIG. 11 is a diagram of an illustrative embodiment of a general computer system.

Referring to FIG. 11, an illustrative embodiment of a general computer system is shown and is designated 1100. The computer system 1100 can include a set of instructions that can be executed to cause the computer system 1100, or a portion thereof, to perform any one or more of the methods or computer based functions disclosed herein. The computer system 1100, or any portion thereof, may operate as a standalone device or may be a hardware or software module within a server or other device, as illustrated in FIGS. 1-4.

The computer system 1100 can also be implemented as or incorporated into various other devices, such as the VoIP telephones or computing devices illustrated in FIGS. 1-3, or any other machine capable of executing a set of instructions (sequential or otherwise) that specify actions to be taken by that machine. In a particular embodiment, the computer system 1100 can be implemented using electronic devices that provide audio, video or data communication. Further, while a single computer system 1100 is illustrated, the term "system" shall also be taken to include any collection of systems or sub-systems that individually or jointly execute a set, or multiple sets, of instructions to perform one or more computer functions.

As illustrated in FIG. 11, the computer system 1100 may include a processor 1102, e.g., a central processing unit (CPU), a graphics-processing unit (GPU), or both. Moreover, the computer system 1100 can include a main memory 1104 and a static memory 1106 that can communicate with each other via a bus 1108. As shown, the computer system 1100 may further include a video display unit 1110, such as a liquid crystal display (LCD), an organic light emitting diode (OLED), a flat panel display, a solid state display, or a cathode ray tube (CRT). Additionally, the computer system 1100 may include an input device 1112, such as a remote control input, an input control panel, a keyboard, a mouse, a gaming station input, or one or more keys disposed on a set-top box device. The computer system 1100 can also include a disk drive unit 1116, or other secondary storage interface configured to receive a removable secondary storage medium. The computer can also include a signal generation device 1118, and a network interface device 1120.

In a particular embodiment, as depicted in FIG. 11, the disk drive unit 1116 may include a computer-readable medium 1122 in which one or more sets of instructions 1124, e.g. software, can be embedded. Further, the instructions 1124 may embody one or more of the methods or logic as described herein. In a particular embodiment, the instructions 1124 may reside completely, or at least partially, within the main memory 1104, the static memory 1106, and/or within the processor 1102 during execution by the computer system 1100. The main memory 1104 and the processor 1102 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 1124 or receives instructions 1124 responsive to a propagated signal, so that a device connected to a network 1126 can communicate audio, video or data over the network 1126. Further, the instructions 1124 may be transmitted or received over the network 1126 via the network interface device 1120.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A system to store contact information, the system comprising:
   a web server including a processor and a memory device accessible to the processor;
   wherein the memory device includes a call log request module executable by the processor to obtain a call log entry from a call log data store via an Internet Protocol (IP) network in response to a request from a user device to view the call log entry, the call log entry including contact information associated with a call;
   wherein the memory device includes a network address book communication module executable by the processor to send the contact information to a network address book server via the IP network in response to a selection of the call log entry received from the user device; and
   wherein the memory device includes a quick address book builder (QAB) module executable by the processor to send a graphical user interface (GUI) to the user device, the GUI including the call log entry.

2. The system of claim 1, further comprising a web user interface module executable by the processor to provide a web portal to receive the request to view the call log entry.

3. The system of claim 1, further comprising a directory information module executable by the processor to obtain directory information related to the contact information from a directory information source via the Internet.

4. A system to store contact information, the system comprising:
   a call server communicating with an Internet Protocol (IP) network to receive contact information related to a call, the call server including a processor and a memory device accessible to the processor;
   wherein the call server includes a call log data store to store the contact information in a call log associated with a user;
   wherein the memory device includes a web server communication module executable by the processor to send the contact information to a web server via the IP network in response to a request from the web server to obtain call log data associated with the user; and
   wherein the memory device includes a quick address book builder (QAB) module executable by the processor to send a graphical user interface (GUI) to the user, the GUI including the contact information.

5. The system of claim 4, further comprising a call processing module executable by the processor to route the call to a user telephone, wherein the contact information includes origination information related to a source of the call.

6. The system of claim 5, wherein the call processing module is executable by the processor to route the call from the user telephone to a destination telephone, wherein the contact information includes destination information related to the destination telephone.

7. The system of claim 4, further comprising a call detail record generation module executable by the processor to generate a call detail record based on the contact information and to store the call detail record at the call log data store.

8. A computer program embedded in a computer-readable medium, the computer program comprising:
   instructions to obtain a call log entry from a call log data store via an Internet Protocol (IP) network in response to a request from a user to view the call log entry, the call log entry including contact information associated with a call;
   instructions to send the contact information to a web server via the IP network in response to a request from the web server to obtain call log data associated with the user; and
   instructions to implement a quick address book builder (QAB) module to send a graphical user interface (GUI) to the user, the GUI including the contact information.

9. The computer program of claim 8, further comprising instructions to obtain at least one voice mail message from the call log data store with the call log data.

10. A computer program embedded in a computer-readable medium, the computer program comprising:
    instructions to communicate with an Internet Protocol (IP) network to receive a call placed to a user;
    instructions to store contact information associated with the call at a call log data store;
    instructions to communicate with a web server via the IP network to receive a request to obtain the contact information;
    instructions to send the contact information to the web server, wherein the contact information is stored at a network address book server of the IP network in response to a selection of the contact information by the user; and
    instructions to implement a quick address book builder (QAB) module to send a graphical user interface (GUI) to the user, the GUI including the contact information.

11. The computer program of claim 10, wherein the IP network is a Voice-over IP (VoIP) carrier network.

12. The computer program of claim 11, wherein the call is received from a public switched telephone network (PSTN) via a VoIP-PSTN gateway.

13. The computer program of claim 12, wherein the call is received from a cellular network via a service switching point of the PSTN.

14. The computer program of claim 10, further comprising instructions to forward the call to a voice mail system when the call is not answered at a telephone device of the user.

* * * * *